US012338172B2

(12) United States Patent
Skocek et al.

(10) Patent No.: US 12,338,172 B2
(45) Date of Patent: Jun. 24, 2025

(54) INTEGRATED PROCESS FOR MANUFACTURING HYDRAULICALLY HARDENING BUILDING MATERIAL

(71) Applicant: HSustainability GmbH, Heidelberg (DE)

(72) Inventors: Jan Skocek, Leimen (DE); Maciej Zajac, Heidelberg (DE); Wolfgang Dienemann, Mauer (DE); Mohsen Ben Haha, Heidelberg (DE)

(73) Assignee: HSustainability GmbH, Heidelberg (DE)

( * ) Notice: Subject to any disclaimer, the term of this patent is extended or adjusted under 35 U.S.C. 154(b) by 497 days.

(21) Appl. No.: 17/764,230

(22) PCT Filed: Oct. 8, 2020

(86) PCT No.: PCT/EP2020/078260
§ 371 (c)(1),
(2) Date: Mar. 28, 2022

(87) PCT Pub. No.: WO2021/074003
PCT Pub. Date: Apr. 22, 2021

(65) Prior Publication Data
US 2023/0036356 A1    Feb. 2, 2023

(30) Foreign Application Priority Data

Oct. 18, 2019  (EP) ..................... 19204165

(51) Int. Cl.
| | |
|---|---|
| *C04B 18/167* | (2023.01) |
| *B28B 1/14* | (2006.01) |
| *B28C 5/38* | (2006.01) |
| *C04B 28/04* | (2006.01) |
| *C04B 40/02* | (2006.01) |

(52) U.S. Cl.
CPC ............. *C04B 18/167* (2013.01); *B28B 1/14* (2013.01); *B28C 5/388* (2013.01); *C04B 28/04* (2013.01); *C04B 40/0231* (2013.01)

(58) Field of Classification Search
CPC ..... B28B 1/14; C04B 18/167; C04B 40/0231; C04B 20/023; C04B 28/02; C04B 18/16; B28C 5/388; Y02W 30/91
See application file for complete search history.

(56) References Cited

U.S. PATENT DOCUMENTS

| | | |
|---|---|---|
| 10,029,951 B2 | 7/2018 | Juilland et al. |
| 10,570,064 B2 | 2/2020 | Monkman et al. |
| 11,208,350 B2 | 12/2021 | Skocek et al. |
| 2018/0029934 A1* | 2/2018 | Monkman ........... C04B 40/0231 |
| 2020/0223760 A1 | 7/2020 | Monkman et al. |

FOREIGN PATENT DOCUMENTS

| | | | |
|---|---|---|---|
| EP | 3498681 A1 | 6/2019 | |
| EP | 3744700 A1 | 12/2020 | |
| WO | WO-2014154741 A1 * | 10/2014 | ........... C04B 18/167 |
| WO | 2015154174 A1 | 10/2015 | |
| WO | 2019115722 A1 | 6/2019 | |

OTHER PUBLICATIONS

International Search Report mailed Nov. 23, 2020 issued in PCT/EP2020/078260.
International Preliminary Report on Patentability mailed on Jan. 24, 2022 issued in PCT/EP2020/078260.

* cited by examiner

*Primary Examiner* — Bryan D. Ripa
*Assistant Examiner* — Anastasia A. Kuvayskaya
(74) *Attorney, Agent, or Firm* — Collard & Roe, P.C.

(57) ABSTRACT

A method for manufacturing hydraulically hardening building materials, includes the steps of:
  providing concrete demolition waste with a maximum particle size of up to 150 mm as a starting material,
  mixing the starting material with water to form a feedstock slurry,
  introducing carbon dioxide or a precursor thereof into the feedstock slurry to form carbonated concrete fines in an amount from 1 to 100 wt.-% of the hardened binder contained in the starting material and to detach the concrete fines from the aggregate contained in the starting material to form a product slurry, and
  mixing the product slurry with a cement forming the building material,
and use of the obtainable building material for manufacturing building structures as well as method for manufacturing a supplementary cementitious material slurry.

21 Claims, No Drawings

INTEGRATED PROCESS FOR MANUFACTURING HYDRAULICALLY HARDENING BUILDING MATERIAL

CROSS REFERENCE TO RELATED APPLICATIONS

This application is the National Stage of PCT/EP2020/078260 filed on Oct. 8, 2020, which claims priority under 35 U.S.C. § 119 of European Application No. 19204165.5 filed on Oct. 18, 2019, the disclosures of which are incorporated by reference. The international application under PCT article 21 (2) was published in English.

BACKGROUND OF THE INVENTION

The present invention relates to an integrated process for manufacturing hydraulically hardening building material, to a use of the building material for manufacturing building structures, and to a slurry containing carbonated recycled concrete fines for use as supplementary cementitious material.

Cement industry is straggling with the high $CO_2$ emissions related to the production of cement clinker. The easiest solution to limit this environmental footprint is to produce composite cements or the increased usage of supplementary cementitious material (SCM) during the concrete production. Unfortunately the increase of the proportion of the composite cements in the product portfolio is limited by the availability of high quality (i.e. reactive materials resulting in appreciable strength evolution) SCM.

Utilization of recycled concrete aggregates helps to achieve higher sustainability and preserves the resources of the natural aggregates. However, the application of the recycled concrete, particularly fines (RCF), is limited because of the inappropriate characteristics, e.g. high water demand.

Additionally, the use of the aggregates from concrete recycling is limited because of the difficulty to separate reacted cement paste from the aggregates, mostly resulting in not appropriate properties of the aggregates. This is a major drawback, since in several regions and locations the sources of fine and coarse aggregates are limited or not accessible.

There are numerous proposals for very varying approaches to reduce $CO_2$ emissions, save energy and natural resources, both cement clinker raw materials as well as aggregate. Some recent ones are WO 2019/115722 A1, not prior published EP19177076.7, WO 2015/154174 A1, and the prior art cited in those documents. All of them aim at making concrete demolition waste useful. But each approach has its problems, like high costs for separation of fine and coarse waste, either lower efficiency of carbon dioxide absorption in dry processes or high energy demand for the more effective wet process and so on. Thus, there is still a need to find effective ways for saving $CO_2$ emissions, energy and natural resources.

Surprisingly, it has now been found that hydraulically hardening building material, specifically concrete paste, can be manufactured from concrete demolition waste without the need to thoroughly separate the hardened paste from aggregate by subjecting the waste with a desired maximum particle size to a wet carbonation and mixing the obtained slurry with cement and any additional desired aggregate as well as other usual additions to provide the hydraulically hardening building material. Thus, no tedious cost and energy intensive essentially complete separation of aggregate and hardened paste is needed, sufficient separation is obtained in the carbonation. Use can be made of the efficiency of wet carbonation for producing reactive SCM from the hardened paste in the RCF without needing a drying step. And concrete based on composite cement is made from SCM available in abundance and without high negative impact on cost and material useful otherwise. Last but not least, carbonation is able to sequester $CO_2$, e.g. produced in burning the used cement clinker, adding to the improved carbon dioxide balance of the building material.

SUMMARY OF THE INVENTION

Therefore, the above object is solved by an integrated process for manufacturing hydraulically hardening building material, comprising:
  providing concrete demolition waste with a maximum particle size of up to 150 mm as a starting material,
  mixing the starting material with water to form a feedstock slurry,
  introducing carbon dioxide or a precursor thereof into the feedstock slurry to form carbonated concrete fines from the hardened binder paste contained in the starting material and to detach the concrete fines from the aggregate contained in the starting material to form a product slurry, and
  mixing the product slurry without drying with cement and optionally one or more of additional aggregates, admixtures, and additives to form the building material. The problems are further solved by using the obtained hydraulically hardening building material for manufacturing building structures, such as pre-cast concrete parts, wherein the building material is cast into a mould or formwork. The object is also solved by manufacturing a supplementary cementitious material slurry comprising the steps:
providing concrete demolition waste with a maximum particle size of up to 150 mm as a starting material,
mixing the starting material with water to form a feedstock slurry, and
introducing carbon dioxide or a precursor thereof into the feedstock slurry to form carbonated concrete fines from the hardened binder paste contained in the starting material and to detach the concrete fines from the aggregate contained in the starting material to form the supplementary cementitious material slurry. Last but not least the object is achieved with a use of a supplementary cementitious material slurry obtainable by:
providing concrete demolition waste with a maximum particle size of up to 150 mm as a starting material,
mixing the starting material with water to form a feedstock slurry, and
introducing carbon dioxide or a precursor thereof into the feedstock slurry transforming from 1 to 100 wt.-% of the hardened binder contained in the starting material to carbonated concrete fines with a reactivity index of at least 1.1 times that of limestone to form the supplementary cementitious material slurry for manufacturing hydraulically hardening building materials without drying.

This supplementary cementitious material or product slurry is used without drying and can be stored for at least up to 1 month, preferably at least up to 3 months, more preferred at least up to 6 months and most preferably up to at least 12 months, without significant loss of pozzolanic and latent hydraulic reactivity of the carbonated concrete fines.

The extended carbonation of recycled concrete has not only potential to bind a significant amount of $CO_2$, but can also improve the properties of the recycled concrete fines and aggregates allowing to reuse them directly in the concrete production. Thus, the invention provides an improved concrete-based building material production process. This includes using concrete demolition waste characterized by a particle size lower than about 150 mm or 100 mm or 50 mm or 32 mm depending on the recycling process to manufacture a valuable supplementary cementitious material slurry containing certain fraction of the aggregates by the accelerated carbonation process. The advantage of such a process is that complicated, cost or energy intensive separation technologies allowing dividing the hardened paste from the aggregates are not needed. Additionally, a novel SCM slurry is obtained by the method according to the invention. This SCM slurry or product slurry contains a suspension of the carbonated hardened cement paste which is activated by the accelerated carbonation process as well as the aggregate which was contained in the starting material and which has been substantially cleaned from adhering hardened binder paste during the process. If desired a concrete demolition waste can be divided into fines and aggregate in any manner known as such to form a starting material containing mainly hardened binder paste and small aggregate or very low amounts of aggregate. The SCM slurry obtained therewith contains only small aggregate, possibly in very small amounts, and substantially no coarse aggregate in this variant. Filtering or centrifuging of the SCM slurry is also possible to reduce the amount of coarse aggregate. It can also be conducted to limit the amount of water in the final concrete or to allow for the transport of the product slurry or to allow storing. The water that is separated from the product slurry can advantageously be reused for the carbonation.

DETAILED DESCRIPTION OF THE INVENTION

Definitions

Herein, the term supplementary cementitious material (abbreviated SCM) is defined as material that has pozzolanic reactivity or latent hydraulic reactivity or both, designated SCM reactivity in the following. One of the possibilities to demonstrate the SCM reactivity is to replace a part of cement by the reactive SCM creating a binder and to compare the strength of such binder with that of a binder containing the same amount of non-reactive material. The strength of the SCM-containing binder is appreciably higher than that of the binder with non-reactive material. Hence, SCM does not include mineral additions without SCM reactivity (at least not without an appreciable degree of SCM reactivity) like limestone. The SCM slurry obtained as product slurry in the method according to the invention contains carbonated hardened binder paste as SCM and aggregate. Depending on the particle size of the starting material (and whether an optional filtering/centrifugation of the product slurry is carried out) the aggregate can comprise small and coarse aggregate or only small aggregate. The product slurry is an SCM within the definition of this invention.

Further, to simplify the description the usual cement chemist notation for oxides: H—$H_2O$, C—CaO, A—$Al_2O_3$, F—$Fe_2O_3$, M—MgO, S—$SiO_2$ and $\bar{S}$—$SO_3$ is used. Also, compounds are mostly named by the pure form, without explicit mentioning of solid solutions, foreign ion substitution and impurities etc. as are usual in technical and industrial materials. As one of ordinary skill in the art knows, the exact composition of phases may vary due to substitution with foreign ions. Such compounds are comprised when mentioning the pure form herein unless it is expressly stated otherwise.

Cement designates a material that, after mixing with an aqueous liquid to form a paste, is able to develop mechanical strength by hydraulic reaction. Thus, cement mostly denotes a clinker ground with or without further components, but also mixtures like super sulphated cement, geopolymer binder, and hydraulic materials not obtained by sintering like a dicalcium silicate obtained by hydrothermal treatment.

Composite binder or binder mixture means a mixture containing cement and a supplementary cementitious material. A binder is usually used adding water or another liquid and mostly also aggregate. Typically, admixtures and/or additives are added to the binder and/or the paste.

Hydraulically hardening building material means a wet mixture that is able to harden hydraulically, and comprises a cement or binder as well as optionally any other addition contained to adjust the properties like final strength, processability of the wet mixture and strength development properties, to the intended use of the building material. For example, a concrete used to build a bridge needs other properties than a screed for casting a floor or a mortar for laying bricks.

Building structure denotes the hardened building material, e.g. a pre-cast concrete element or a floor or a bridge part from cast in place concrete.

Concrete demolition waste designates the crushed material obtained during demolition of concrete containing structures like buildings and road surfaces from which the foreign materials like wood, metal parts, brick parts, and plastic, have been substantially completely removed. Concrete demolition waste contains concrete fines from the hardened binder paste and aggregates. The aggregate size in the concrete demolition waste depends on the settings in the crushing and grinding, usually crushing and grinding continues until the maximum particle size is 150 mm or smaller, preferably 100 mm or smaller, more preferred 50 mm or smaller and most preferred 32 mm or smaller. The aggregate contained in the concrete demolition waste typically carries adhered binder paste on the surface. The adhered hardened binder paste often adheres two or more aggregate particles together. Typical aggregate used in concrete has a maximum particle size of 32 mm, so particles in the starting material above this size result from two or more aggregate particles being adhered together by the hardened binder paste. Recycled concrete fines, abbreviated RCF, means the hardened binder paste with varying content of small aggregate obtained from concrete demolition waste by crushing and cutting off coarse aggregates (particle size limit e.g. 4 mm or 8 mm or 16 mm). A strict separation of hardened binder paste from aggregates is very difficult, so RCF usually contains a considerable amount of the small size aggregate, predominantly sand, and depending on the particle size limit applied also bigger aggregate like gravel and correspondingly sized agglomerates of small aggregate still adhered together by hardened binder paste. Usually, RCF contains mostly the ground hardened binder paste together with fine sand/aggregates, usually in amounts of 30 to 80 wt.-% of the total material weight. Typical compositions of four typical RCF (which contain fine aggregates being mostly quartz) are shown in table 1.

TABLE 1

|  | RCF 1 | RCF 2 | RCF 3 | RCF 4 |
|---|---|---|---|---|
| chemical composition [wt-%] | | | | |
| LOI | 17.98 | 21.59 | 12.23 | 7.89 |
| $SiO_2$ | 43.02 | 43.63 | 54.72 | 74.15 |
| $Al_2O_3$ | 6.38 | 5.70 | 6.32 | 3.64 |
| $Fe_2O_3$ | 3.02 | 2.74 | 2.36 | 1.43 |
| CaO | 24.39 | 21.51 | 18.29 | 10.44 |
| MgO | 1.39 | 1.22 | 1.81 | 0.90 |
| $K_2O$ | 0.80 | 0.76 | 1.00 | 0.77 |
| $Na_2O$ | 0.35 | 0.32 | 0.42 | 0.28 |
| $SO_3$ | 1.21 | 1.07 | 1.28 | 0.69 |
| minerological composition [wt-%] | | | | |
| Quartz | 28.3 | 28.7 | 39.1 | 58.4 |
| Calcite | 13.9 | 13.6 | 6.2 | 2.7 |
| Dolomite | 2.4 | 1.7 | — | — |

The invention provides an improved process to make hydraulically hardening building materials and/or SCM from concrete demolition waste without or with very limited separation of RCF from the aggregate. Thus, the starting material is concrete demolition waste containing RCF with more or less aggregate, in contrast to prior approaches requiring that aggregate be separated from the fines as much as possible. The exact composition and particle size distribution of the starting material depends on the original binder and composition used in the concrete and on the demolishing and crushing procedures applied. The improved building material production method according to the invention starts with the provision of concrete demolition waste as starting material. This step includes the testing of the aggregates and cement paste content in the material. Foreign materials have been separated off beforehand, however, residues can usually be tolerated. If needed the maximum particle size can be adjusted, e.g. by grinding and/or sieving. The starting material can also be mixed from different concrete demolition wastes to ensure a more homogenous composition or adjust the phase composition.

The next step is preparation of a feedstock slurry containing water and the starting material. The weight ratio of water to solid material (hardened cement paste+aggregates) is typically adjusted from 0.1 to 20, preferably from 0.5 to 15, and most preferably from 1 to 10. Water introduced together with further additions or in the form of a carbon dioxide solution is taken into account for the mentioned ratio. Likewise, if the starting material is wet, any water contained in it is also calculated as part of the water and not of the starting material.

It is possible to include additional material into the feedstock slurry that accelerates the carbonation process and/or improves the final properties of the SCM or the building material made with it. Preferably, substances for enhancing the carbonating process or mixtures of two or more thereof are used as additional material. Typically, additional material will be included in an amount from 0.001 to 1 wt-% with respect to the total starting material.

Suitable materials include aqueous solvents like alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof, halogenides, ethylenedinitrilotetraacetic acid (EDTA) or other substances that improve dissolution of $CO_2$ in the solution. Additionally enzymes such as carbonic anhydrase can be used to enhance carbonation efficiency and modify the properties of the reaction products. It is to be noted that these additions may have not only one action but can exercise a double role. They can e.g. modify the hydration process of the final binder as well as modify the carbonation process. The effect can largely depend on the dosage.

Moreover it is possible to add substances that regulate the pH during the carbonation process in order to enhance the precipitation of calcium carbonate. These include metal hydroxides and carbonates and similar substances.

Further, it is possible to add substances that modify the morphology of the precipitating calcium carbonate during the carbonation process. This provides the advantage of building less dense shales of hydrates-carbonates product and enables higher carbonation and hydration degrees. Suitable are for example magnesium salts, polyacrylic acid, polyacrylamide, polyvinyl alcohol, polyvinylsulfonic acids, styrenesulfonate, citric acid and other organic acids, polysaccharides and phosphonates, polycarboxylates.

Furthermore, it is possible to add admixtures that modify properties of the final building material made from it already to the starting material or to the feedstock slurry (usually those will be added to the building material or cement or to the product slurry together with the cement). Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of water/binder ratio normally provides an increase of strength, such admixtures are commonly used. Air entraining agents are also able to improve flowability and can be used fore this aim or are need for other reasons such as, but not limited to, density modifications, compactibility improvements etc.

Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acids and their salts, phosphonates, sugars (saccharides). It is also possible to add admixtures that are designed to modify the rheology properties to control the setting time, i.e. plasticizers and super-plasticizers. Those can have a retarding impact as well, e.g. lignosulphonates, polycarboxylic acids, etc.

All admixtures are used in the amounts known as such, wherein the amount is adapted to a specific binder and special needs in the known manner.

Additives can be added as well to the starting material or feedstock slurry, but usually those are added to the building material or cement or with the cement to the product slurry. Usual and useful additives are e.g. fillers, pigments, reinforcing elements, self-healing agents etc. All these can be added in the amounts known per se.

The feedstock slurry comprising the starting material and water is subjected to a wet, direct carbonation that achieves higher carbonation degrees and/or faster carbonation than carbonation of dry materials. Carbonation can be performed at temperatures from 0 to 9° C., preferably from 10 to 80° C. and most preferred from 15 to 60° C. The carbonation time is typically from 1 second to 10 hours and preferably from 10 second and 8 hours and most preferred from 15 second and 6 hours. The time depends on the concentration of carbon dioxide, higher concentration allows shorter times and lower concentration requires longer times.

The $CO_2$ may be introduced as gas or as a liquid. The gaseous $CO_2$ is preferably injected into the slurry ensuring a high surface area of the gas. The $CO_2$ concentration in the gas may range from 5 to 100%, while the flow rate of the gas should be from 1-100 liters/hour/$g_{cement\ paste}$. To benefit from the sequestration effect exhaust gas from a cement plant is used in one embodiment, which typically has a $CO_2$ concentration from 14 to 30 Vol.-%, or up to 60-90 Vol.-% in case the plant operates in the oxyfuel mode. When a liquid solution of $CO_2$ is used it can have a concentration of $CO_2$ from 0.1 to 200 g/l, preferably from 1 to 150 g/l and most preferably from 10 to 100 g/l. Using a solution is advantageous in case the method is carried out in the field to prepare the building material as cast in place concrete.

During the carbonation the material is advantageously stirred, e.g. mixed in a concrete mixer or concrete truck. The mixing device has to be adapted when $CO_2$ gas is used to allow its introduction into the slurry, preferably via gas distribution unit(s).

The carbonation degree of the concrete fines, i.e. the binder paste, is adjusted to range from 1 to 100%, preferably from 20 to 99% and most preferably from 30 to 98%. This results in a reactivity index of the carbonated RCF, i.e. the SCM slurry made according to the invention, of at least 1.1 times, preferably 1.2 times, most preferred 1.3 times, that of limestone (LL according to EN 197-1) at the same replacement level of 30% of CEM I 32.5 R according to EN 197-1, at 28 days, in mortar. The reactivity index is defined as the ratio of the EN 196-1 mortar strength of the SCM-containing composite binder over the strength of a limestone-containing composite binder.

The obtained product slurry of carbonated RCF with aggregate is a useful, reactive SCM. Storage times of several days up to 12 months are possible without significant diminishing of SCM reactivity. In the obtained SCM slurry the original aggregate particles are substantially separated, usually essentially free, from adhering hardened binder paste and, therefore, constitute a good quality aggregate. Preferably the product slurry of carbonated concrete fines can be stored at least 1 month, more preferred at least 3 months, still more preferred at least 6 months and most preferred at least 12 months. If desired the product slurry can be filtered or centrifuged to remove water and/or aggregate with a size above a defined limit, e.g. above 16 mm or above 8 mm or above 4 mm. Removed water can advantageously be reused in the feedstock slurry mixing step or for mixing other hydraulically hardening building material, especially concrete. Removed aggregate is useful to make other hydraulically hardening building material, especially concrete, but also for any other known use of aggregate. In contrast to prior proposals the SCM manufactured according to the invention is used without drying, i.e. even if some water is removed the SCM still contains a considerable amount of water and is not dry or powdery.

In one embodiment the obtained SCM slurry is stored to be used upon demand. Alternatively, the SCM slurry is directly used to manufacture the hydraulically hardening building material. Thus, either after storage or directly the needed amount of cement, as well as any necessary further water, fine and coarse aggregates and any desired further additions are added. The amounts of added cement, water, and aggregate as well as other additions depend on the composition of the SCM slurry and the desired final composition of the building material. Further additions are predominantly chemical admixtures, e.g. plasticizers, and additives, especially mineral additives, known from the concrete technology, used to adjust the chemical and physical properties of the building material in fresh or in hardened state. The mixing of the building material can take place in the same device as used for the carbonation or in a separate device. One example of a separate device is mixing of concrete in a concrete truck. In this case, the manufacturing of a building structure immediately follows. The use of the building material to manufacture building structures comprises manufacturing the building material and casting it into a mould or form to provide the building structure.

The reactivity of the supplementary cementitious material according to the invention allows its use in building materials in an amount from 1 to 80 wt-%, preferably from 5 to 50 wt-% calculated on a dry/dry basis. For minimal contents of aggregate in the SCM slurry the total dry weight of it can be taken, but usually only the carbonated binder paste is taken into account for this ratio, which is estimated from the determination of the concrete demolition waste composition. I.e. the amount of hardened binder paste in the starting material is assumed to be fully carbonated and the weight calculated is taken as the dry SCM weight. Alternatively, the amount of carbonated hardened binder paste in the SCM slurry can be determined in any other manner known as such.

Suitable cements are Portland cement (OPC), Portland-composite cement, slag cement, pozzolanic cement, and other composite cements according to EN 197-1, calcium sulfoaluminate cement (CSA), calcium aluminate cement (CAC) and other hydraulic cements including lime as well as components providing with the SCM slurry according to the invention not standardized cements like super sulfated cement and geopolymer cement. Thus, further SCMs like slag, fly ash and other main cement constituents according to EN 197-1 can be added. Preferably, only the SCM according to the invention is contained since that is technically easier. Fly ash is often added to concrete, this is also possible for building material made according to the invention.

The cement is usually present in an amount from 5 to 95 wt-%, preferably 30 to 80 wt-% in the binder. In addition, usual additives and/or admixtures can be used as described above for adding to the starting material. Naturally, the amounts of all components in a specific binder add up to 100%, so if SCM, aggregate and cement are the sole components their amounts add up to 100%, when there are other components, the amount of SCM, aggregate and cement is less than 100%.

The cement used is selected according to the intended use of the building structure made, taking into account the properties of the SCM slurry, especially its reactivity, and the acceptable further additions. For example, a super plasticiser allows a decrease of the water-binder ratio improving strength while maintaining processabiltiy of the building material paste, allowing use of a less reactive cement. Another consideration is heat development, for massive building structures a slow hardening process is beneficial and may be acceptable. Portland cement is the preferred cement.

The amount and kind of aggregate is also determined by the intended use of the building structure made. For concrete, both to make pre-cast concrete parts and cast in place concrete, coarse aggregate with sizes 2/8, 4/8, 8/16, 16/32, 4/32, or 8/22 is usual. This will typically need to be added or augmented. It is also possible that the amount of small aggregate is insufficient, then sand with particle sizes 0/1, 0/2, or 0/4 is also added. Or a suitable mixture of coarse and small aggregate is added, e.g. size 0/22 or 0/32. Floor screeds, mortars, and plasters are exemplary building structures that mostly contain no coarse aggregate, so only small aggregate has to be added when the amount in the starting material and resulting SCM slurry used is too low. As mentioned earlier, filtering or centrifuging of the slurry can be used to remove too coarse aggregate if desired, but usually it is preferable to adjust the particle size of the starting material. Specifications of aggregate for concrete are found in EN 12620.

The method according to the invention allows the transformation of the hydrated cement paste into mainly calcite (other forms of calcium carbonate are possible) and reactive amorphous silica and alumina gels or alumina-silica gels, potentially hydrated, and essentially clean aggregate. The carbonated hardened binder paste is characterized by a high pozzolanic and latent-hydraulic reactivity. This provides synergies between calcium carbonate and alumina rich material during reaction in the cementitious matrix. An appreciable evolution of compressive strength of a composite cement as building material and a significant reduction of the clinker content in the final building material is achieved.

Additionally, the above described process allows a use of the aggregate contained in the concrete demolition waste without a separation from RCF and limits the need to use virgin materials (aggregate) which allows preserving natural resources and provides a financial benefit in several locations.

Additional benefit of the process is its simplicity. For the carbonation an adapted concrete mixer can be used. No additional changes of the concrete recycling technology is required.

The central advantages are:
Significant sequestration potential of $CO_2$, e.g. $CO_2$ sequestration from cement plant stack
Enabling valorization of the waste materials into the added value products
Securing the resources for the concrete production
Ability to use exclusively industrial wastes for valuable supplementary cementitious material production and concrete production
High reactivity of carbonated concrete fines that allows high clinker replacement ratio and limits the use of cement clinker in building materials like concrete If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

The invention includes all combinations of described and especially of preferred features that do not exclude each other.

What is claimed is:
1. A method for manufacturing hydraulically hardening building materials, comprising the steps:

providing concrete demolition waste comprising hardened binder paste and aggregate and having a maximum particle size of up to 150 mm as a starting material,
mixing the starting material with water to form a feedstock slurry,
introducing carbon dioxide or a precursor thereof into the feedstock slurry to form carbonated concrete fines from the hardened binder paste contained in the starting material in an amount from 1 to 100 wt.-% of the hardened binder paste and to detach the hardened binder paste from the aggregate contained in the starting material to form a product slurry that contains all of the concrete demolition waste in the form of a suspension of carbonated hardened binder paste as well as the aggregate which was contained in the starting material and which is substantially free from adhering hardened binder paste,
and
mixing the product slurry with a cement to form the building material without drying of the slurry and without separation of any of the aggregate contained in the concrete demolition waste from the carbonated hardened binder paste.

2. The method according to claim 1, wherein the starting material has a maximum particle size of up to 100 mm.

3. The method according to claim 2, wherein the starting material has a maximum particle size of up to 32 mm.

4. The method according to claim 3, wherein the weight ratio of water to starting material ranges from 0.5 to 15.

5. The method according to claim 3, wherein the temperature is adjusted in a range from 10 to 80° C.

6. The method according to claim 3, wherein the carbonation is performed for 10 seconds to 8 hours.

7. The method according to claim 1, wherein the weight ratio of water to starting material ranges from 0.1 to 20.

8. The method according to claim 1, wherein the temperature is adjusted in a range from 0 to 99° C.

9. The method according to claim 1, wherein the carbonation is performed for 1 second to 10 hours.

10. The method according to claim 1, wherein an exhaust gas is used as the carbon dioxide with a purity of 5 to 100% and a flow rate is adjusted to 1-100 liters $CO_2$ per hour and per g of hardened binder paste in the starting material.

11. The method according to claim 1, wherein the cement is selected from Portland cement, Portland-composite cement, slag cement, pozzolanic cement, and other composite cements according to EN 197-1, calcium sulfoaluminate cement, calcium aluminate cement, lime, and components providing a super sulfated cement or geopolymer cement with the carbonated concrete fines.

12. The method according to claim 11, wherein the cement is Portland cement.

13. The method according to claim 12, wherein at least one of:
one or more admixture(s),
one or more additive(s),
additional aggregates
is/are added during mixing of the product slurry with the cement, and/or to the starting material and/or to the feedstock slurry and/or to the cement.

14. The method according to claim 12, wherein the hydraulically hardening building material is cast into a mold for manufacturing a pre-cast concrete part.

15. The method according to claim 1, wherein at least one of:
one or more admixture(s), one or more additive(s),
additional aggregates is/are added during mixing of the product slurry with the cement, and/or to the starting material and/or to the feedstock slurry and/or to the cement.

16. The method according to claim 1, wherein the building material is cast into a mold or formwork for manufacturing a building structure.

17. The method according to claim 16, wherein the the building structure is a pre-cast concrete part.

18. A method for manufacturing a supplementary cementitious material slurry comprising the steps:
providing concrete demolition waste comprising hardened binder paste and aggregate and having a maximum particle size of up to 150 mm as a starting material,
mixing the starting material with water to form a feedstock slurry, and
introducing carbon dioxide or a precursor thereof into the feedstock slurry transforming from 1 to 100 wt.-% of the hardened binder contained in the starting material to carbonated concrete fines with a reactivity index of at least 1.1 times that of limestone to form the supplementary cementitious material slurry without drying and without a separation of any of the aggregate contained in the concrete demolition waste from the hardened binder paste, wherein the slurry contains a suspension of carbonated hardened binder paste as well as all of the aggregate which was contained in the starting material and which is substantially free from adhering hardened binder paste.

19. The method according to claim 18, wherein the starting material has a maximum particle size of up to 100 mm.

20. The method according to claim 18, wherein the weight ratio of water to starting material ranges from 1 to 20, and/or the temperature is adjusted in a range from 0 to 99° C., and/or the carbonation is performed for 1 second to 10 hours, and/or an exhaust gas is used as the carbon dioxide and the flow rate is adjusted to 1-100 liters $CO_2$ per hour and per g of hardened binder paste in the starting material.

21. The method according to claim 18, wherein the supplementary cementitious material slurry is filtered and/or centrifuged to remove water.

* * * * *